United States Patent [19]
Engle

[11] 3,833,095
[45] Sept. 3, 1974

[54] HYDRAULIC POWER BRAKE SYSTEM

[75] Inventor: Thomas H. Engle, Cape Vincent, N.Y.

[73] Assignee: General Signal Corporation, Rochester, N.Y.

[22] Filed: Mar. 5, 1973

[21] Appl. No.: 337,977

[52] U.S. Cl. ......... 188/71.9, 188/106 P, 188/196 D
[51] Int. Cl. ........................................... F16d 55/02
[58] Field of Search............ 188/71.9, 106 F, 106 P, 188/170, 196 D, 72.4, 73.3, 73.6, 72.3, 250 G; 192/109 A

[56] References Cited
UNITED STATES PATENTS

| | | | |
|---|---|---|---|
| 2,840,193 | 6/1958 | Mann et al.......................... | 188/72.3 |
| 3,114,436 | 12/1963 | Larson............................... | 188/72.3 |
| 3,442,354 | 5/1969 | Belart .............................. | 188/73.3 X |
| 3,543,900 | 12/1970 | Colbert et al................... | 188/73.1 X |
| 3,545,575 | 12/1970 | Pinnhammer...................... | 188/73.6 |
| 3,590,964 | 7/1971 | Krause............................ | 188/71.9 X |
| 3,661,230 | 5/1972 | Burnett.............................. | 188/71.9 |

*Primary Examiner*—Lloyd L. King
*Assistant Examiner*—Randolph A. Reese
*Attorney, Agent, or Firm*—Harold S. Wynn

[57] ABSTRACT

A hydraulic power brake system is disclosed having a brake actuator housing containing service and hand brake pressure chambers and pistons for actuating a brake head. An automatic adjuster is provided connecting the two pistons comprising two cooperating members connecting the pistons. A first of the members is permitted substantial rotary movement and limited axial movement and a second of the cooperating members is permitted axial movement but not rotary movement. A spring such as a wave washer is used for yieldably permitting greater axial movement of the first member when brakes are applied by actuation of the hand brake piston than when brakes are applied by actuation of the service brake piston.

13 Claims, 8 Drawing Figures

HYDRAULIC POWER BRAKE SYSTEM

BACKGROUND OF INVENTION

While this invention is subject to a wide range of applications, it is especially suited for use in a combined service and hand brake control system for a disc brake and will be particularly described in that connection.

Various systems have been proposed for controlling a disc brake from either of a plurality of sources. One of the sources can be a conventional service brake system and the other can be a hand brake system, both of which are adapted to control braking torque applied through a single brake head. There are separate coaxial control chambers and pistons in a single housing for the two systems and the hand brake piston can be subject to actuation to a released position by fluid pressure and to an application position by a spring of the Belleville type. Belleville springs can provide sufficient braking torque only for limited axial movement of the hand brake piston, and they are generally required to actuate the brake head through axial actuation of the service brake piston and other linkage in the service brake chamber. The other linkage can include a threaded adjuster that takes up slack between the service brake piston and the hand brake piston when the service brakes are applied. Even with this adjustment, there is lost motion in the threads of the adjuster which can materially reduce braking torque available from the Belleville springs.

An object of the present invention is to provide a braking system which substantially obviates one or more of the limitations and disadvantages of the described prior braking systems.

Another object of the present invention is to provide improved structure facilitating replacement of brake pads.

Other objects, purposes and characteristic features will be in part obvious from the accompanying drawings, and in part pointed out as the description of the invention progresses.

SUMMARY OF INVENTION

A hydraulic power brake system is provided having a brake actuator housing containing service and hand brake pressure chambers and pistons for actuating a brake head and an automatic adjuster is provided for connecting the two pistons. The automatic adjuster comprises two cooperating members connecting the two pistons, a first of the members being permitted substantial rotary movement and limited axial movement, and a second of the members being permitted axial movement but not rotary movement. Yieldable means is provided for permitting greater axial movement of the first member when brakes are applied by actuation of the hand brake piston than when brakes are applied for actuation of the service brake piston to compensate for lost motion in threads of the first and second members.

An improved power brake system is provided wherein a brake head is journalled on carrier pins and a friction pad is detachably secured to the brake head. The friction pad is secured to a back plate which has mounting lugs and registration openings for facilitating replacement of worn pads.

For a better understanding of the present invention together with other and further objects thereof, reference is had to the following description, taken in connection with the accompanying drawings, while its scope will be pointed out in the appending claims.

In the accompanying drawings.

Figure 1:
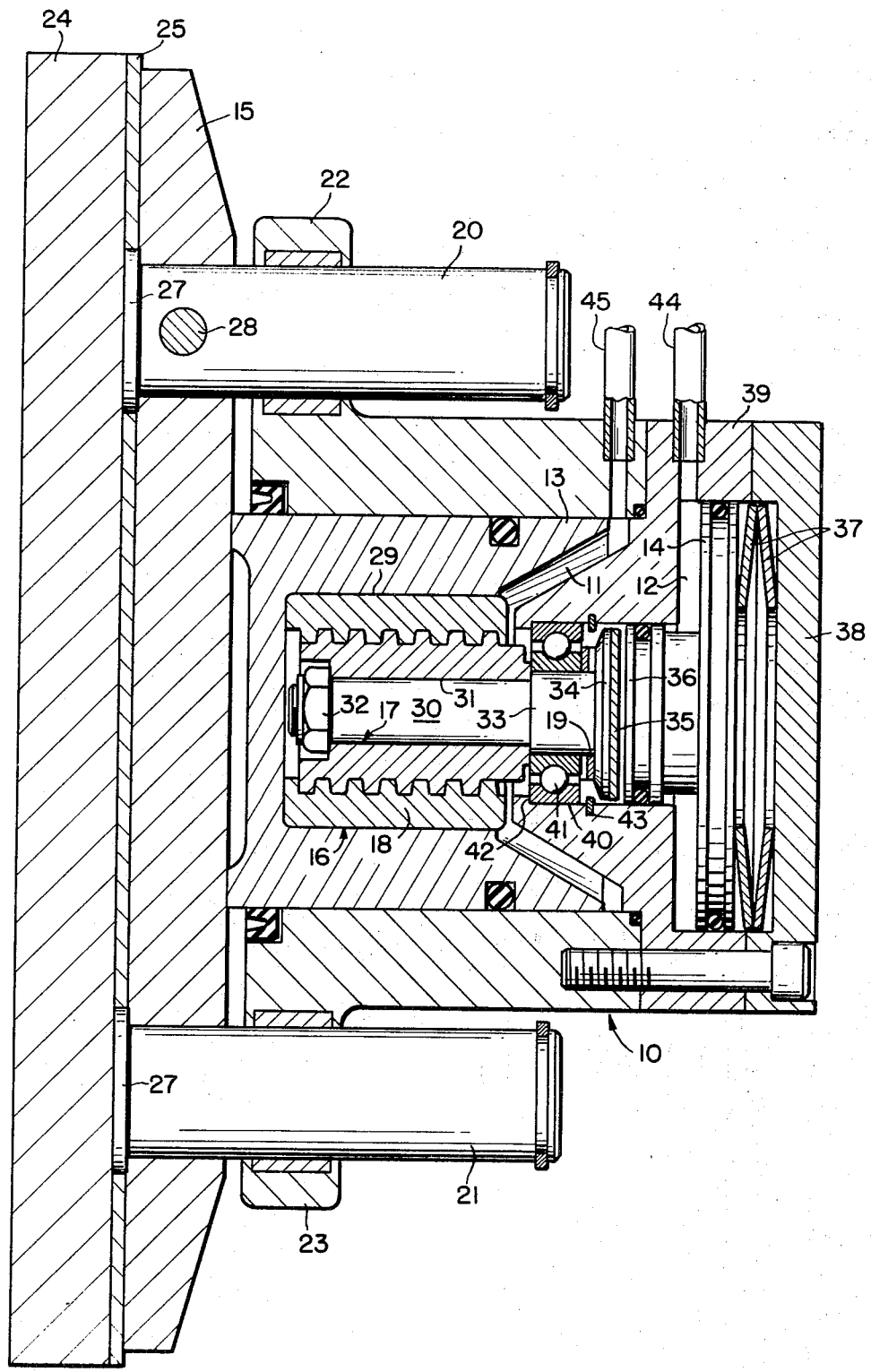
FIG. 1 is a sectional elevational view of a brake operating mechanism according to a preferred embodiment of the present invention taken along the line 1—1 of FIG. 2.
Figure 2:
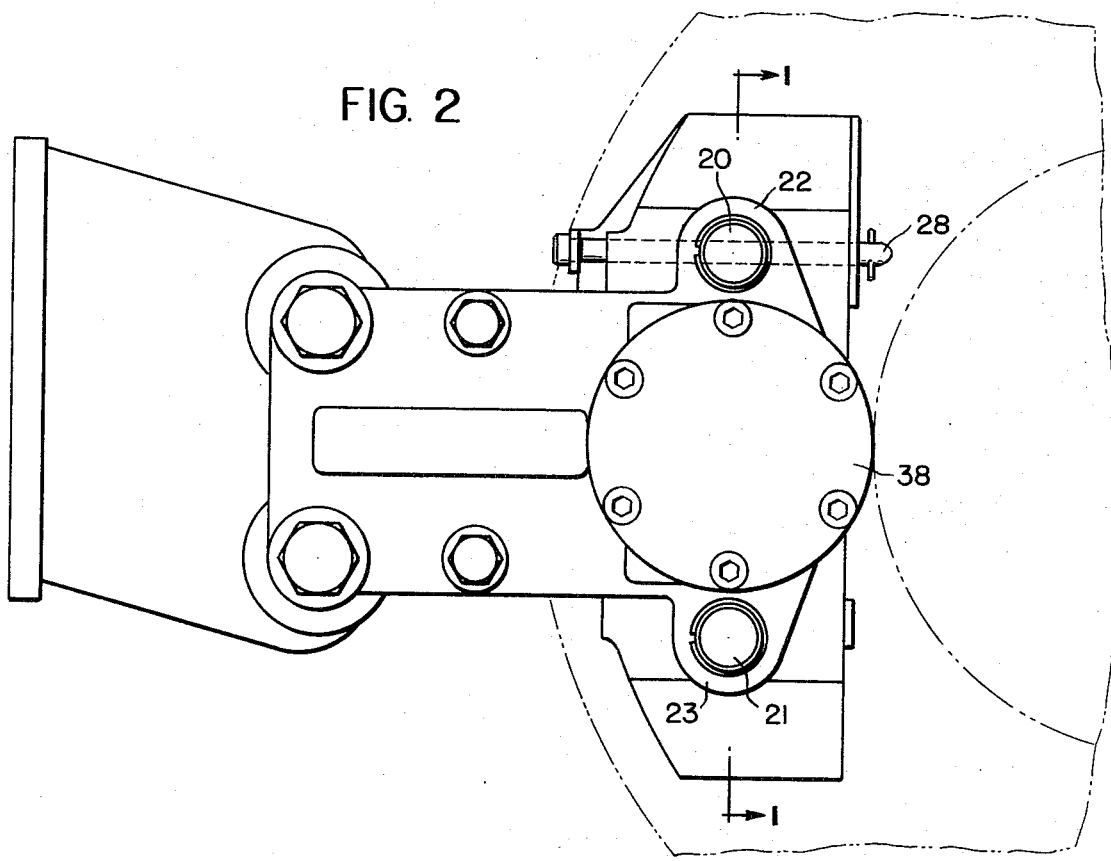
FIG. 2 is an elevational view of a caliper disc brake mechanism according to the preferred embodiment of the present invention.
Figure 3:
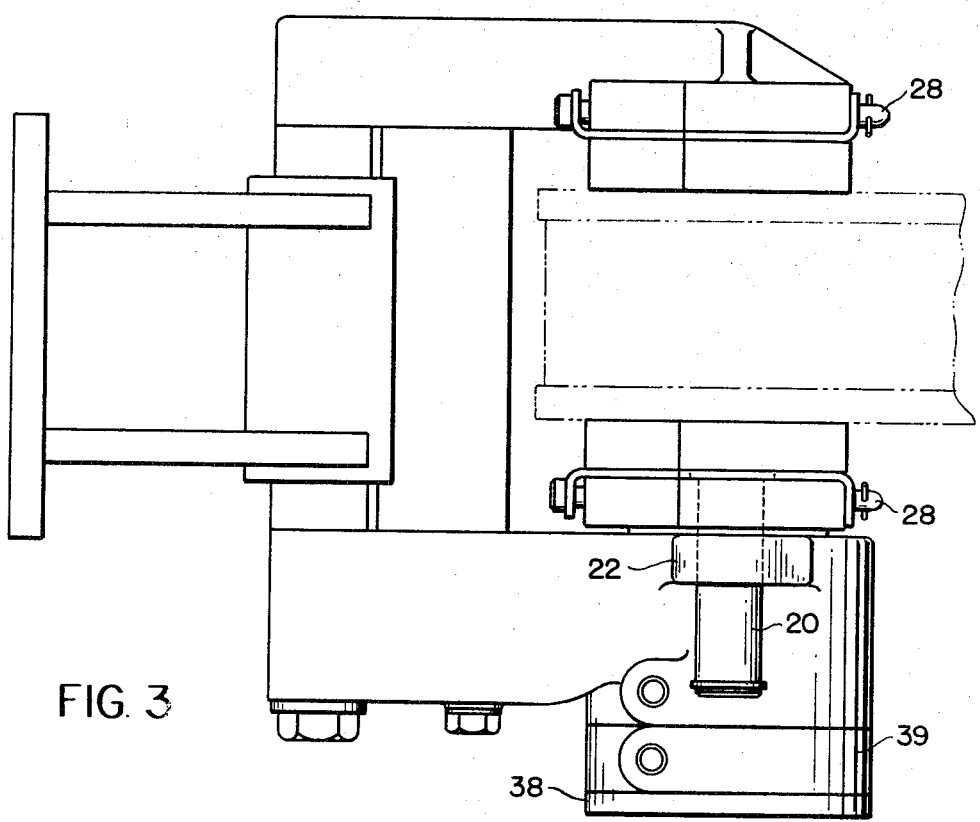
FIG. 3 is a plan view of the brake caliper mechanism shown in FIG. 2.

With reference to FIG. 1, a hydraulic power brake system is illustrated having a brake actuator housing 10 containing service and hand brake pressure chambers 11 and 12 respectively and service and hand brake pistons 13 and 14 respectively. These pistons 13 and 14 are for actuation of a brake head 15, the pistons 13 and 14 being connected by an automatic adjuster 16.

The adjuster 16 comprises a first member 17 which is permitted substantial rotary movement and limited axial movement and a second member 18 that is permitted axial movement but not rotary movement.

A yieldable wave washer is disposed at the right-hand end of the first of the movable members 17 of the automatic adjuster 16 for permitting greater axial movement of the member 17 when brakes are applied by actuation of the hand brake piston 14 than when the brakes are applied by actuation of the service brake piston 13.

Figure 5:
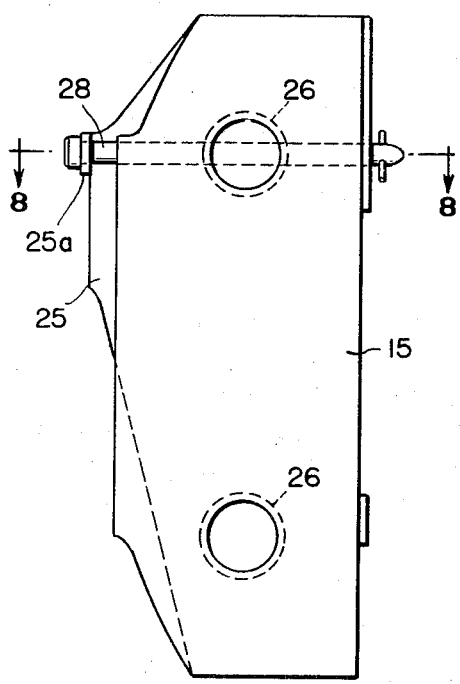
FIG. 5 is a left side elevational view of the brake head and pad assembly of FIG. 4.
Figure 6:
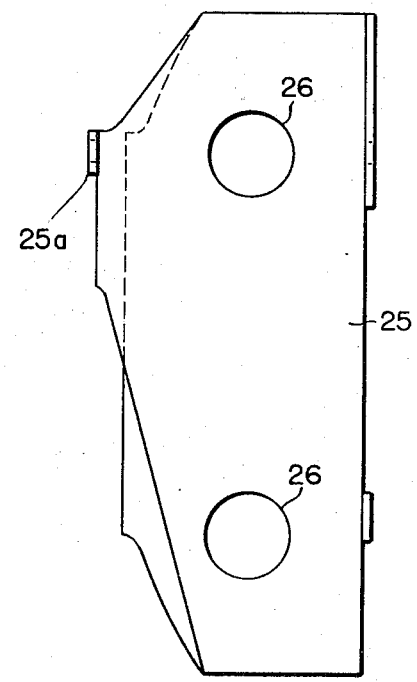
FIG. 6 is a left side elevational view of a pad and back plate assembly.
Figure 4:
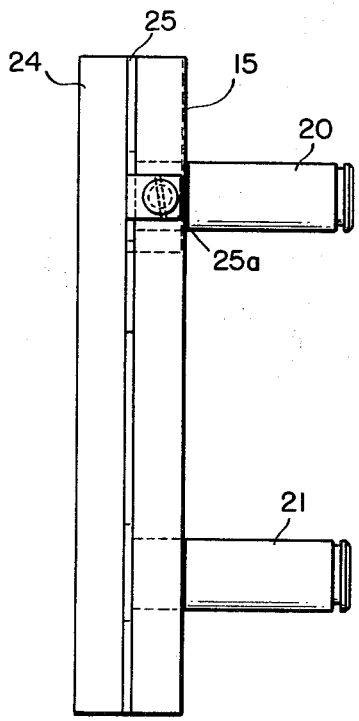
FIG. 4 is an elevational view of a brake head and brake pad assembly.
Figure 7:
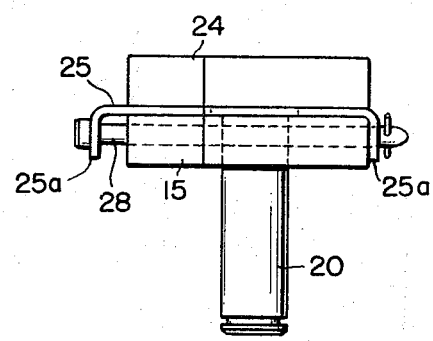
FIG. 7 is a plan view of a brake head and end assembly.
Figure 8:
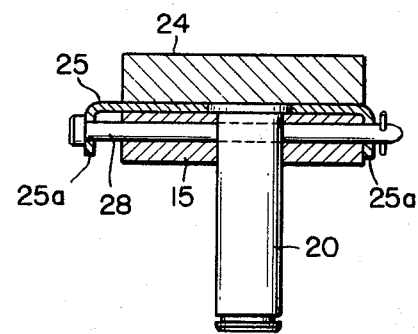
FIG. 8 is a section view taken along the line 8—8 of FIG. 5 of a brake head and pad assembly.

The brake head 15 is secured to carrier pins 20 and 21 that are journalled in bosses 22 and 23 respectively of the housing 10. A friction pad 24 is secured to a back plate 25 which is detachably secured to the brake head 15. The back plate 25 has openings 26 (see FIGS. 4, 5 and 6) formed therein for registration with the heads 27 of the carrier pins 20 and 21. A pin 28 is provided for detachably securing the friction pad 24 to the brake head 15.

The first member 17 of the automatic adjuster 16 comprises a stud 30 carrying a threaded bushing 31 retained between a nut 32 and a shank portion 33. The stud 30 has a head 34 having secured thereto an abrasive surface 35 disposed opposite a reduced diameter left-hand end 36 of the hand brake piston 14. Threads of the automatic adjuster 16 are preferably of the Acme type to provide for smooth operation of the automatic adjuster. There must necessarily be some lost motion in the threads.

The second member 18 of the automatic adjuster 16 is in the form of a nut, secured in an axial bore 29 of the service piston 13, and threaded onto the bushing 31.

Belleville springs 37 are provided for biasing the hand brake piston 14 to the left, these springs being normally maintained under compression between the right-hand end of the piston 14 and an end plate 38.

A divider 39 in the housing 10 has a central bore 40 for supporting a bearing 41 which is in turn fitted onto the shank 33 of stud 30. The bearing 41 is retained against axial movement between a shoulder 42 and a lock ring 43. The divider 39 separates the service chamber 11 from the hand brake chamber 12 and journals the rotary member 17 of the automatic adjuster 16.

Having thus described the general organization of the system according to a preferred embodiment of the present invention, further consideration will be given relative to the mode of operation of the system.

OPERATION

The brakes are normally released because of fluid pressure in chamber 12 normally applied through port 44, and the service chamber 11 has had its pressure exhausted through the service port 45. Under these conditions, the service piston 13 is disposed adjoining the brake head 15 and there is a small space between the left-hand side 36 of the hand brake piston 14 and the abrasive head 35 of the rotary member 17 of the automatic adjuster 16. Thus the rotary member 17 is free to be rotated by axial movement of the nut 18 upon actuation of the service piston 13.

If is assumed that service brake pressure is applied through port 45 to chamber 11, the service piston 13 becomes actuated to the left and in turn actuates the brake head 15 to the left for applying braking torque. Such movement causes rotation of the element 17 of the automatic adjuster 16 so that the hand brakes can always be applied with substantially the same amount of actuation of hand brake piston 14, irrespective of the position of the service brake piston 13. Release of the service brake fluid pressure in chamber 11 permits the service brake piston 13 to move to the right and thus cause the automatic adjuster 16 to be threaded in the opposite direction to effectively provide a shorter connection between the service piston 13 and a point closely adjoining the hand brake piston 14.

To consider the mode of operation of the system for application of the hand brakes, it will be assumed that pressure is reduced in the hand chamber 12 by fluid exhausted through port 44. This permits the bias of Belleville springs 37 to actuate the hand brake piston 14 to the left and thereby contact the abrasive surface 35 to prevent rotation of the automatic adjuster 16. The brake head 15 is moved to the left to apply braking torque by pressure applied from the Belleville springs 37 through service piston 13, automatic adjuster 16 and the hand brake piston 14. In order to move the brake head 15 to the left sufficiently to apply full braking pressure, it is necessary that the rotary element 30 of the automatic adjuster 16 be permitted to move axially to the left an amount equivalent to lost motion in the threads of the automatic adjuster 16 as well as an amount to provide full braking torque. This amount of axial movement is permitted by the compression of wave washer 19. Without compression of this washer, the limited amount of axial movement of the element 30 of automatic adjuster 16 would only be sufficient to take up the lost motion in the threads of the adjuster 16, and would not provide sufficient travel of the service piston 13 to apply full braking torque through the brake head 15.

The hand brakes can be released by applying fluid pressure through port 44 to the hand brake chamber 12 and thus through port 44 to piston 14 to the right to compress the Belleville springs 37 between piston 14 and end plate 38 and restore the conditions of the system to normal.

Replacement of worn brake pads can readily be accomplished by prying the brake head 15 to the right, thus threading the automatic adjuster to its minimum length position. Removal of pin 28 then permits the pad 24 and its associated back plate 25 to be removed from the top of the brake assembly and replaced by a new pad inserted from the top. Lugs 25a of the back plate 25 serve as stops to approximately locate the pad and back plate assembly when inserted from the top, until the back plate 25 can be disposed in registration over heads 27 of carrier pins 20 and 21. Pin 28 is then inserted through openings in lugs 25a to secure the back plate in operating position. The only extra space required to replace the back plate 25 and pad 24 is that required to remove the plate 25 from over the heads 27 of the carrier pins 20 and 21.

Having thus described a hydraulic power brake system as a preferred embodiment of the present invention, it is to be understood that various modifications and alterations may be made to the specific embodiment shown without departing from the spirit or scope of the invention.

What is claimed is:

1. A hydraulic power brake system for selective operation of disc brakes having a brake actuator housing containing axially spaced coaxial service and hand brake pressure chambers and service and hand brake pistons disposed end to end for actuating brake heads and an automatic adjuster disposed coaxially within the service piston for connecting the two pistons wherein an improved automatic ajuster comprises;
   a. means including two coaxial cooperating cylindrical members connecting the two pistons and connected to each other through threads normally permitting free rotation of one member relative to the other;
      1. a first of the members being permitted substantial rotary movement and limited axial movement relative to the housing,
      2. a second of the members being permitted axial movement but not rotary movement relative to the housing;
   b. yieldable means including a spring disposed directly between the movable first member and the fixed housing for yieldably permitting greater axial movement of the first member relative to the housing to compensate for back-lash in the threads when brakes are applied by actuation of the hand brake piston than when brakes are applied by actuation of the service brake piston.

2. A hydraulic power brake system according to claim 1 wherein the yieldable means is a wave washer.

3. A hydraulic power brake system according to claim 1 wherein the second member is a nut and the first member is a stud threaded into the nut.

4. A hydraulic power brake system according to claim 3 wherein the nut is secured to the service piston and is operable axially with the service piston.

5. A hydraulic power brake system according to claim 4 wherein the stud has a head that is normally spaced a small distance from the hand brake piston when the hand brake piston is in its released position.

6. A hydraulic power brake system according to claim 5 wherein hand brake operating members is provided for driving the hand brake piston against the head of the stud, compressing the yieldable means and actuating a brake shoe by axial movement of the stud, the nut and the service piston as permitted by the yieldable means.

7. A hydraulic power brake system according to claim 6 wherein means is provided for driving the hand brake piston in a direction for brake release in response to fluid pressure and in opposite direction for application of the brakes by spring pressure.

8. A hydraulic power brake system according to claim 6 wherein means is provided for preventing rotation of the stud when it is moved axially by the hand brake piston.

9. A hydraulic power brake system according to claim 8 wherein the means for preventing rotation comprises an abrasive surface on the head of the stud that is contacted by the hand brake piston.

10. A hydraulic power brake system according to claim 1 wherein a brake head is secured to carrier pins journalled by the housing and a disc brake friction pad is detachably secured to the brake head and means is provided for detachably securing the friction pad comprising;
   a. a back plate for supporting the friction pad;
   b. the back plate having registration openings formed therein for receiving the carrier pins, and
   c. means for detachably securing the back plate to the brake head.

11. A hydraulic power brake system according to claim 10 wherein said carrier pins have heads protruding slightly from the brake head and the back plate openings are in registration with the heads of the carrier pins for detachably positioning the friction pads.

12. A hydraulic power brake system according to claim 11 wherein the detachable securing means comprises lugs on sides of the back plate and a mounting pin securing the lugs to the brake head.

13. A hydraulic power brake system according to claim 12 wherein the mounting pin passes through openings formed in the lugs, a portion of the brake head and transveresly through one of the carrier pins.

* * * * *